United States Patent Office 3,178,450
Patented Apr. 13, 1965

3,178,450
PREPARATION OF DIHALOXANTHONES
Edward J. McNelis, Media, Pa., assignor to Sun Oil Company, Philadelphia, Pa., a corporation of New Jersey
No Drawing. Filed July 24, 1961, Ser. No. 125,955
5 Claims. (Cl. 260—335)

This invention relates to the preparation of dihaloxanthones and more particularly to hte preparation of 2,6- and 3,6-dihaloxanthones by the pyrolysis of alkali metal 2,4-dihalobenzoates.

According to the invention an alkali metal salt of 2,4-dihalobenzoic acid in which the halogen is chlorine, bromine or fluorine is heated to a temperature in the range of 250–375° C., preferably 300–340° C., whereby the salt is converted partly to 2,6- and 3,6-dihaloxanthones. There is also formed in minor amount an ester which is m-halophenyl-2,4-dihalobenzoate. The alkali metal component of the starting material can be any of the alkali metals, namely, lithium, sodium, potassium, rubidium and cesium.

The major reaction that takes place in the pyrolysis can be represented by the following equation:

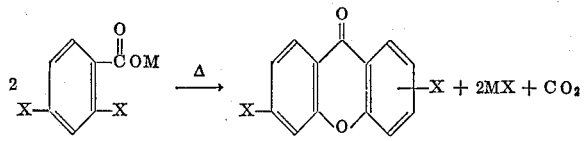

In the equation M represents an alkali metal and X represents chlorine, bromine or fluorine. The X shown with a dangling valence can be at either the 2-position or 3-position. Hence the major products of the reaction are 2,6 and 3,6-dihaloxanthones, and these isomers generally are formed in approximately equal amounts. There is also formed in the reaction a minor amount of m-halophenyl-2,4-dihalobenzoate which can be represented by the following formula:

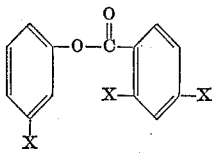

wherein X represents the halogen.

The pyrolysis preferably is carried out at about atmospheric pressure and in a manner to exclude air and moisture from the reaction mixture while permitting escape of the released carbon dioxide. The temperature should be in the range of 250–375° C. and more preferably 300–340° C. The time of heating the reaction mixture will vary depending mainly upon the temperature used but generally will be in the range of 0.1–2.0 hours.

The product mixture from the reaction contains, in addition to the two dihaloxanthones and the ester above mentioned, alkali metal halide and some unreacted starting material. The mixture can be worked up by dissolution in a suitable solvent such as benzene, acetone or ether, filtering to remove the alkali metal halide, washing with water to remove the unreacted starting material and then evaporating the solvent. A solution of the residue in a suitable solvent such as benzene can be passed through a chromatographic column containing alumina to separate the individual reaction products. The order in which the products pass out of the column is as follows: the ester, the 2,6-dihaloxanthone and the 3,6-dihaloxanthone. By collecting the effluent in suitable fractions, these products can be isolated individually.

The following example is illustrative of the invention:

4.58 g. of potassium 2,4-dichlorobenzoate were placed in a glass tube which had been urged with nitrogen and the tube was heated while the nitrogen purge was continued. The mixture was heated to above 300° C. for 30 minutes, the maximum temperature reached being 309° C. After cooling, the reaction mixture was triturated with benzene and filtered to separate potassium chloride. The filtrate was washed with water to separate unreacted starting material. Upon acidification of the wash water, 0.916 g. of 2,4-dichlorobenzoic acid was obtained. Solvent was evaporated from the washed material and then a concentrated solution of this material in benzene was chromatographed in a column of acid washed alumina. The first fraction off the column contained 275 mg. of the above-mentioned ester. After crystallization of this material from ethanol, it was found to have a melting point of 98.5–99.5° C. and an analysis as follows:

|  | Found | Theoretical |
|---|---|---|
| Percent C | 51.67 | 51.77 |
| Percent H | 2.56 | 2.34 |
| Percent Cl | 35.75 | 35.27 |

The second fraction off the column contained about 0.326 g. of 2,6-dichloroxanthone. After crystallization of this product from alcohol, it was found to have a melting point of 216–216.5° C. and a characteristic ultraviolet absorption peak at 10.55μ. Its analysis was as follows:

|  | Found | Theoretical |
|---|---|---|
| Percent C | 58.63 | 58.89 |
| Percent H | 2.38 | 2.28 |
| Percent Cl | 25.29 | 26.75 |

The third fraction from the column contained about 0.326 g. of 3,6-dichloroxanthone. After crystallizing this product from alcohol, it was found to have a melting point of 183–184° C. and characteristic ultraviolet absorption peaks at 10.5μ, 11.58μ and 11.85μ.

The yield of dichloroxanthones based on the total material from the column in the foregoing example was 53%. The selectivity for producing dichloroxanthones in the reaction was about 41%.

When other alkali metals are substituted for potassium and when the halogen is bromine or fluorine in place of chlorine, substantially similar results are obtained.

I claim:
1. Method of producing 2,6- and 3,6-dihaloxanthone which comprises heating an alkali metal 2,4-dihalobenzoate in which the halogen is selected from the group con- sisting of chlorine, bromine and fluorine to a temperature in the range of 250–375° C.

2. Method according to claim 1 in which said temperature is in the range of 300–340° C.

3. Method according to claim 1 in which the halogen is chlorine.

4. Method according to claim 1 in which the alkali metal is potassium.

5. Method according to claim 1 wherein potassium 2,4-dichlorobenzoate is heated.

References Cited in the file of this patent
UNITED STATES PATENTS
3,078,299  McNeilis _____ Feb. 19, 1963

OTHER REFERENCES

Noller: Chemistry of Organic Compounds, Chapter 12, 5th edition, W. B. Saunders Co., Philadelphia (1955).

Karrer: Organic Chemistry, 2nd edition, Elsevier Publishing Co., Inc., New York (1946).